United States Patent
Koefod

(10) Patent No.: US 7,507,349 B2
(45) Date of Patent: Mar. 24, 2009

(54) DEICER COMPOSITION

(75) Inventor: Robert Scott Koefod, Maple Grove, MN (US)

(73) Assignee: Cargill, Incorporated, Wayzala, MN (US)

( * ) Notice: Subject to any disclaimer, the term of this patent is extended or adjusted under 35 U.S.C. 154(b) by 0 days.

(21) Appl. No.: 11/729,991

(22) Filed: Mar. 29, 2007

(65) Prior Publication Data

US 2007/0227398 A1 Oct. 4, 2007

Related U.S. Application Data

(60) Provisional application No. 60/786,870, filed on Mar. 29, 2006.

(51) Int. Cl.
*C09K 3/18* (2006.01)

(52) U.S. Cl. .......................................... 252/70; 106/13
(58) Field of Classification Search ................... 252/70; 106/13
See application file for complete search history.

(56) References Cited

U.S. PATENT DOCUMENTS

| 4,990,278 | A | * | 2/1991 | Wyeth | 252/70 |
| 5,531,931 | A | | 7/1996 | Koefod | |
| 5,843,330 | A | * | 12/1998 | Barbour et al. | 252/70 |
| 6,398,979 | B2 | * | 6/2002 | Koefod et al. | 252/70 |
| 6,800,217 | B2 | * | 10/2004 | Koefod et al. | 252/70 |
| 7,147,797 | B2 | * | 12/2006 | Koefod et al. | 252/70 |
| 7,294,285 | B2 | * | 11/2007 | Koefod et al. | 252/70 |
| 7,309,451 | B2 | * | 12/2007 | Koefod | 252/70 |

FOREIGN PATENT DOCUMENTS

| CA | 2 525 983 A1 | 5/2006 |
| GB | 1 443 838 | 7/1976 |
| JP | 60-195178 A * | 10/1985 |
| WO | WO 01/64811 A2 | 9/2001 |

* cited by examiner

*Primary Examiner*—Anthony J Green
(74) *Attorney, Agent, or Firm*—MH2 Technology Law Group LLP

(57) ABSTRACT

A deicer comprises a mixture of a deicing agent and a radiation absorber. The radiation absorber results in an increased ice-melting capacity than using the deicing agent alone. The deicer can include a deicing salt such as sodium chloride, and the radiation absorber can include a dye, which can be water soluble. The deicer can also include a corrosion inhibitor and/or wetting agent. Further, a method of making a deicer includes mixing a deicing agent and a radiation absorber. The radiation absorber can be dissolved in a liquid, such as bittern, which can be sprayed on a solid deicing salt.

12 Claims, No Drawings

DEICER COMPOSITION

CROSS REFERENCE TO RELATED APPLICATIONS

The present application claims the benefit of the U.S. Provisional Application Ser. No. 60/786,870, filed on Mar. 29, 2006. The present application is also related to the U.S. patent application Ser. No. 11/270,323, filed Nov. 8, 2005, which claims the benefit of the U.S. Provisional Application No. 60/626,508, filed on Nov. 8, 2004. The U.S. Provisional Application Ser. No. 60/786,870, U.S. patent application Ser. No. 11/270,323 and U.S. Provisional Application No. 60/626,508 are incorporated herein by reference.

BACKGROUND OF THE INVENTION

The invention relates to deicer compositions. More particularly, the invention relates to deicer compositions with improved ice-melting properties.

Solid deicers, such as rock salt (sodium chloride), are commonly applied to roads and other surfaces during winter months in areas where snow and/or ice tend to form on those surfaces after precipitation. Though solid deicers such as rock salt are effective in melting ice and snow, over application of solid deicers is typically undesirable. Rock salt, for example, is corrosive to metal parts in vehicles and can damage concrete. After the snow and ice melt, the salt remains on the ground or is carried by water melted from snow and ice into soil or groundwater, causing undesirable increase of salinity in soil and underground water. There is thus a need to increase the deicing capability of solid deicers, thereby reducing the amount of solid deicers needed per unit snow and/or ice melted.

SUMMARY OF THE INVENTION

The invention disclosed herein is aimed at providing an improved method and composition for deicing. According to one aspect of the invention, a deicer comprises a mixture of a deicing agent and a radiation absorber. The radiation absorber results in an increased ice-melting capacity than using the deicing agent alone. The deicer can include a deicing salt such as sodium chloride, and the radiation absorber can include a dye, which can be water soluble. The deicer can also include a corrosion inhibitor and/or pre-wetting agent.

According to another aspect of the invention, a method of making a deicer includes mixing a deicing agent and a radiation absorber. The radiation absorber can be dissolved in a liquid, such as an aqueous solution of magnesium chloride, which can be sprayed on or blended with a solid deicing salt, such as sodium chloride.

DETAILED DESCRIPTION OF ILLUSTRATIVE EMBODIMENTS

According to an aspect of the invention, a deicer comprises a mixture of a deicing agent and an agent capable of absorbing incident radiation and converting it to heat. Suitable radiation absorbing agents include chemicals with a high molar absorptivity in the infra-red, visible and/or ultraviolet portions of the spectrum and exhibit high quantum yields for internal conversion, thereby efficiently converting absorbed solar radiation to heat. Compounds of this type include certain dyes.

In certain embodiments of the invention, a deicing composition contains a deicing salt (typically in solid or mostly solid form), a corrosion inhibitor and a dye as a radiation absorber. More specifically, the deicing salt includes sodium chloride and magnesium chloride. The corrosion inhibitor includes triethanolamine. The dye includes Naphthol Green B. Specifically, concentrations (by weight) of ingredients include from 90 to 99 percent sodium chloride, up to 5 percent magnesium chloride, up to 1000 ppm triethanolamine, and up to 1000 ppm of Naphthol Green B. Other concentrations of ingredients, such as 93.5% to 98% sodium chloride and up to 2.0% magnesium chloride, can also be used.

A variety of deicing agents can be used. Typically, a deicing agent is a substance having at least a component that, when combined with water or ice, forms a liquid that has a lower melting point than water. A deicing salt is typically a salt that, when combined with water or ice, forms a liquid that has a lower freezing point than water. As an example, sodium chloride can form a solution with water, with a freezing point of the solution lower than 0° C.

In other embodiments of the invention, a deicer contains from about 90 to about 97 percent sodium chloride, from about 0.6 to about 1.9 percent magnesium chloride, from about 150 to about 500 ppm triethanolamine, and from about 50 to about 200 ppm of Naphthol Green B.

According to another aspect of the invention, a deicer is made by mixing a deicing agent with a radiation absorber and optionally other ingredients such as corrosion inhibitors and pre-wetting agents. In one illustrative embodiment of the invention, a deicer is made by blending an aqueous solution that contains about 30% magnesium chloride, 0.8% triethanolamine, and about 0.25% dye with a solid deicing salt. Other liquids, such as aqueous solutions of chlorides and acetates, can also be used. For example, aqueous solutions of sodium chloride, calcium chloride and potassium acetate can be used. Other ingredients can also include urea, glycerin, and propylene glycol.

In one aspect of the disclosure, a deicer comprises a mixture of from about 90 to about 99 percent by weight sodium chloride; from about 0.5 to about 5 percent by weight magnesium chloride; from about at least 2 percent by weight urea, glycerin or propylene glycol or a combination thereof; and from about 50 ppm to about 0.5 percent by weight dye. In some embodiments, the mixture comprises from about 90 to about 99 percent by weight sodium chloride; and from about 3 to about 5 percent by a pre-wetting solution, which comprises: from about 20 to about 35 percent by weight magnesium chloride; from about at least 2 percent by weight selected from the group consisting of urea, glycerin, and propylene glycol, and mixtures thereof; from about 100ppm to about 1.0 percent by weight triethanolamine, and from about 50 ppm to about 0.5 percent by weight Naphthol green B. In further embodiments, the pre-wetting solution comprises: from about 22 percent to about 30 percent by weight magnesium chloride; from about 2 percent to about 10 percent by weight selected from the group consisting of urea, glycerin, and propylene glycol, and mixtures thereof; from about 0.5 percent to about 1.0 percent by weight triethanolamine, and from about 0.20percent to about 0.50 percent by weight dye. In certain alternative embodiments, the pre-wetting solution comprises: about 26 percent by weight magnesium chloride; from about 7 percent to about 8 percent by weight selected from the group consisting of urea, glycerin, and propylene glycol, and mixtures thereof; about 0.7 percent by weight triethanolamine, and about 0.25 percent by weight Naphthol green B.

In another aspect of the disclosure, a deicer comprises a mixture of from about 90to about 99 percent by weight sodium chloride; from about 0.5 to about 5 percent by weight magnesium chloride; from about at least 2% by weight selected from the group consisting of urea, glycerin, and propylene glycol and mixtures thereof; from about 100 ppm to about 0.5percent by weight triethanolamine, and from about 50 ppm to about 0.5 percent by weight Naphthol green B.

In other embodiments of the invention, a deicer is made by blending an aqueous solution that contains about 20 to about 35% magnesium chloride, at least about 2% urea, and about 0.15% to about 0.50% dye with a deicing salt. More preferably, a deicer is made by blending an aqueous solution that contains about 22% to about 30% magnesium chloride, about 0.5% to about 1.0% triethanolamine, about 2-10% urea, and about 0.20 to about 0.35% dye with a deicing salt. Still more preferably, a deicer is made by blending an aqueous solution that contains about 26% magnesium chloride, about 0.7% triethanolamine, about 7-8% urea, and about 0.25% dye with a deicing salt. Also, glycerin and/or propylene glycol may be substituted for urea, and combinations thereof.

As noted above, the deicer according to the invention can include a solid deicing agent, such as sodium chloride, magnesium chloride, calcium chloride, urea, acetate salts, formate salts and combinations thereof. Suitable solid deicing agents include mixtures of sodium chloride and magnesium chloride. A liquid containing a radiation absorber and other ingredients such as corrosion inhibitors and pre-wetting agents can be applied by a spray to or blended with the solid deicing agent as a pre-treatment to improve the performance and application of the deicer. In such mixtures, the solid deicing salt particles in the deicer can be at least partially coated with the radiation absorber.

Magnesium chloride, when used, may be derived from liquid bittern. As used herein, liquid bittern is a product derived from sea salt production, and is the liquid remaining after removal of sodium chloride from seawater. Liquid bittern normally contains water along with a high concentration of magnesium chloride and lower concentrations of other salts. In many embodiments of the invention, the liquid bittern contains from 20 to 35 percent magnesium chloride. However, liquid bittern containing other concentrations, such as less than 20 percent, of magnesium chloride can also be used.

As in some of the embodiments discussed above, triethanolamine can be use as a corrosion inhibitor in accordance with the invention. Other suitable corrosion inhibitors can be used. Examples include phosphate salts, such as orthophosphates, polyphosphates, pyrophosphates, and organic phosphonates. Diammonium phosphate and monosodium phosphate are two specific examples of phosphate salts that can be used individually or together to provide corrosion inhibition. Calcium phosphates are also suitable for use as a corrosion inhibitor.

Other combinations of ingredients for deicers can be used in combination with radiation absorbers to achieve increased ice-melting capacity. Examples of combinations of ingredients for deicers include those disclosed in the U.S. Pat. Nos. 6,800,217 and 6,398,979, both of which are co-owned with the present application and are incorporated herein by reference.

In addition to the Naphthol Green B dye used in the examples above, other suitable radiation absorbers can be used. In general, the radiation absorber, such as a dye, serves to increase the melting capacity of the deicer than using solid deicers alone by increasing the solar radiation absorption capability of the deicer. Thus, a radiation absorber having higher optical absorption coefficients than the deicing agent in a wide range in the solar radiation spectrum, including the ultraviolet radiation range, is preferable. An example of another radiation absorber is a black dye, such as Orcoform Black, available from Organic Dyestuffs Corporation, East Providence, R.I.

All patents and publication referred to above are incorporated herein by reference. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A deicer, comprising a mixture of:
   a deicing agent;
   a pre-wetting agent, wherein the pre-wetting agent comprises
      from about 90 to about 99 percent by weight sodium chloride;
      from about 0.5 to about 5 percent by weight magnesium chloride; and
      from about 2 to about 10 percent by weight urea, glycerin, propylene glycol, and combinations thereof; and
   from about 50 ppm to about 0.5 percent by weight of a radiation absorber.

2. The deicer of claim 1, wherein the radiation absorber comprises a dye.

3. The deicer of claim 2, wherein the deicing agent comprises a solid deicing salt.

4. The deicer of claim 1, wherein the radiation absorber has a greater solar radiation absorption capability than the deicing agent.

5. The deicer of claim 2, wherein the dye is water-soluble.

6. The deicer of claim 1, wherein the magnesium chloride is derived from bittern.

7. A deicer, comprising a mixture of:
   from about 90 to about 99 percent by weight sodium chloride; and
   from about 3 to about 5 percent by weight of a pre-wetting solution comprising:
      from about 20 to about 35 percent by weight magnesium chloride;
      from about 2 to about 10 percent by weight urea, glycerin, propylene glycol, and combinations thereof;
      from about 100 ppm to about 1.0 percent by weight triethanolamine; and
      from about 50 ppm to about 0.5 percent by weight Naphthol green B.

8. The deicer of claim 7, wherein the pre-wetting solution comprises:
   from about 22 to about 30 percent by weight magnesium chloride;
   from about 2 percent to about 10 percent by weight urea, glycerin, propylene glycol, and combinations thereof;
   from about 0.5 percent to about 1.0 percent by weight triethanolamine; and
   from about 0.20 percent to about 0.50 percent by weight Naphthol green B.

9. The deicer of claim 7, wherein the pre-wetting solution comprises:
   about 26 percent by weight magnesium chloride;
   from about 7 percent to about 8 percent by weight urea, glycerin, propylene glycol, and combinations thereof;
   about 0.7 percent by weight triethanolamine; and
   about 0.25 percent by weight Naphthol green B.

10. A method of making a deicer, the method comprising mixing from about 90 to about 99 percent by weight of a solid deicing agent with from about 3 to about 5 percent by weight of a pre-wetting solution comprising:
   from about 20 to about 35 percent by weight magnesium chloride;

from about 2 to about 10 percent by weight of urea, glycerin, propylene glycol, and combinations thereof;

from about 100 ppm to about 1.0 percent by weight triethanolamine; and from about 50 ppm to about 0.5 percent by weight Naphthol green B.

11. The method of claim 10, wherein the deicing agent comprises sodium chloride.

12. The method of claim 10, wherein the pre-wetting solution comprises from about 2 to about 10 percent by weight urea.

* * * * *